No. 689,004. Patented Dec. 17, 1901.
C. M. KEMP.
CARBURETER.
(Application filed Dec. 24, 1900.)
(No Model.) 2 Sheets—Sheet 1.
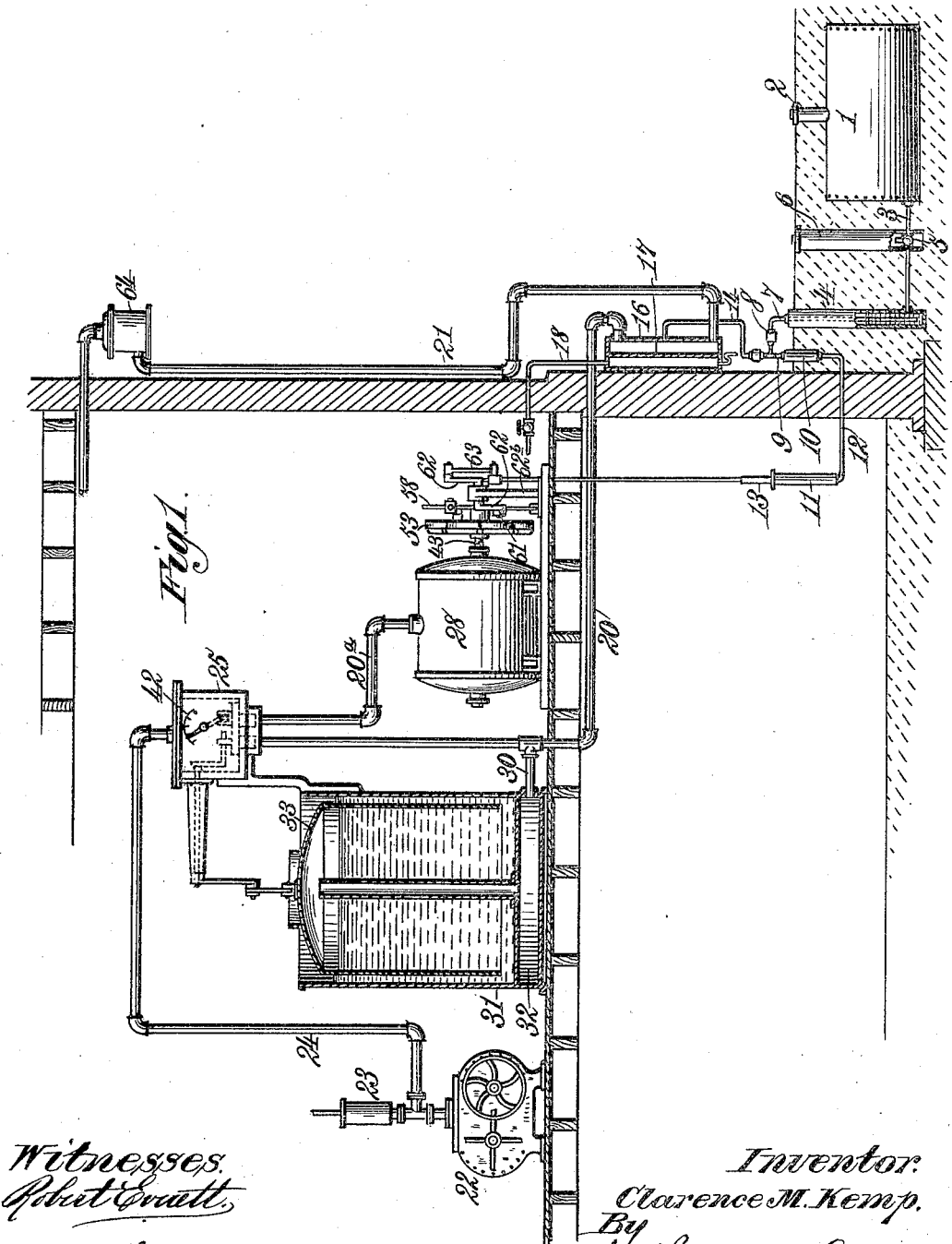
Witnesses
Robt Pratt,
W. H. Clarke.
Inventor:
Clarence M. Kemp,
By J. Granville Meyers
Atty.

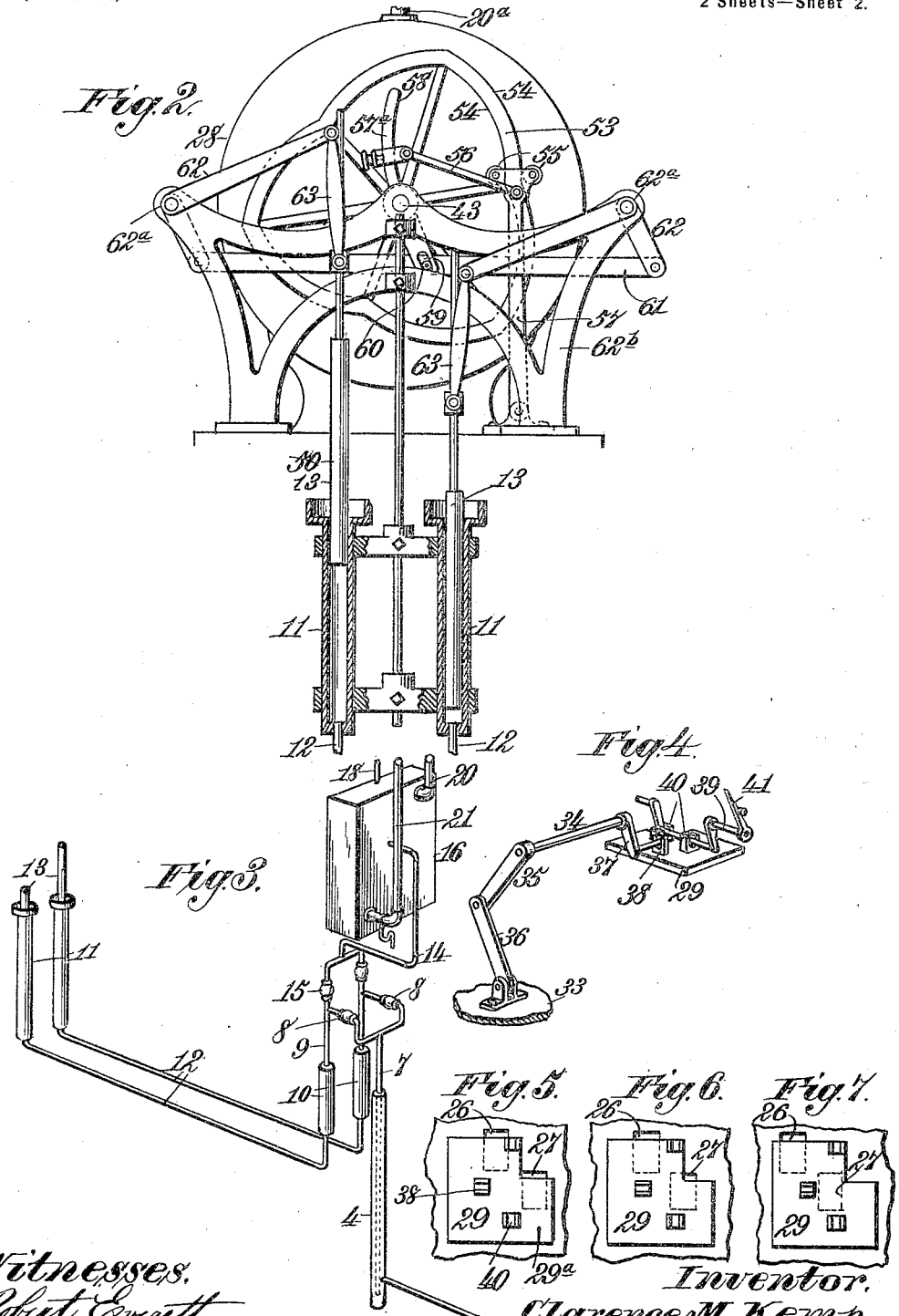

ns that appear to be of different sizes or shapes. # UNITED STATES PATENT OFFICE.

CLARENCE M. KEMP, OF BALTIMORE, MARYLAND.

CARBURETER.

SPECIFICATION forming part of Letters Patent No. 689,004, dated December 17, 1901.

Application filed December 24, 1900. Serial No. 40,896. (No model.)

*To all whom it may concern:*

Be it known that I, CLARENCE M. KEMP, a citizen of the United States, residing at Baltimore, Maryland, have invented certain new and useful Improvements in Gas-Machines, of which the following is a specification.

This invention relates to apparatus for producing gas, and especially to that type of gas-producing apparatus in which the gas is manufactured from the more highly volatile hydrocarbons, such as naphtha, commingled with air, such an admixture of air and volatilized naphtha producing a gas which when the constituent elements are correctly and proportionately compounded is well adapted for lighting and heating purposes. Some objections, however, have arisen in connection with gas-generating plants of this particular type, chief among which is the danger from fire resulting from the storage of a supply of naphtha in the building in which the plant is installed or from the imperfect construction and operation of the machines used to mix the air and hydrocarbon and the consequent escape of the highly-inflammable gas into the building, and many of the means hitherto adopted for the prevention of explosions and conflagrations have been inadequate to protect property from fires and satisfy the requirements of fire-insurance underwriters relative to the placing of risks on property in which plants of this type are installed, the most stringent rules as to the introduction of naphtha and like oils of highly volatile and explosive nature into insured buildings being enforced by all insurance companies. A further objection has been found to exist in the practical operation of generators and mixers of the class to which this invention belongs owing to the difficulty experienced in producing a gas in which the elements are compounded in such proportions as will give the best results, this being due in part to the fact that the demand on the plant is not constant, but varies according to the number of lights to which gas is being supplied or the work being performed, and the compounding of the gas cannot therefore be done according to fixed and unvarying proportions, but must vary in accordance with the varying demand. Unless this proportioning of the air and naphtha is carefully and scientifically done the quality and supply of gas are not uniform and result in a gas which is either oversaturated or weak in quality, and such fluctuations occurring as to give imperfect and varying lighting and heating flames the efficiency of the plant is seriously affected.

The apparatus which forms the subject-matter of the present invention has been designed with the object of overcoming the objections noted above, and by practicing the invention as set forth in detail hereinafter all danger of fire and consequent menace to property where a gas-generating plant of this type is installed is eliminated, this being due to the fact that in the present case the inflammable oil is completely isolated from the apparatus and the building in which it is placed and none of the volatile oil in liquid form can enter the building or the apparatus contained therein, but only the enriched air or gaseous mixture passes into the building and to the burners. Furthermore, the apparatus compounds the air and hydrocarbon so carefully and completely and in such exact proportions to the demand that not only will all the liquid be volatilized, and not merely that which is richest and most highly volatile, but it will also be so uniformly mixed as to give a gas of constant quality whether the demand on the plant be great or small, the control of the air and oil supply being automatic, so that the requisite proportions are always delivered to the carbureter or mixer, this being accomplished by a peculiar and novel construction of controlling-valve and operating mechanism therefor, as well as the pump operating and controlling means, whereby if a full head of gas be required the necessary adjustments and movements of the valve will be regulated to give such result, while if the demand for gas be slight the controlling-valve and its operating parts will reduce the supply of gas-forming constituents proportionately, thus supplying just the amount of gas necessary for immediate consumption and avoiding the danger of accumulating an oversupply or the inconvenience of too small a head.

In the drawings accompanying and forming a part of this specification is illustrated one form of gas-generating apparatus for carrying my invention into effect, in which—

Figure 1 is a general view of a gas-generating plant, some of the parts being shown in section for clearness of illustration. Fig. 2 is an end view of the pump-motor and the operating mechanism with so much of the liquid piston-pumps as will illustrate their connections with the operating mechanism. Fig. 3 is a diagrammatic isometric projection of the carbureter to show its connections with the pump which delivers the naphtha to it and its relation to the stand-pipe from which the oil is drawn. Fig. 4 is an isometric projection showing the novel valve which is employed to govern the air-ports and its controlling and adjusting means, while Figs. 5, 6, and 7 are plan views of the valve, showing it in its several positions relative to the air-ports.

In the description hereinafter like numerals indicate like parts in the several views.

Referring to Fig. 1, the numeral 1 indicates a naphtha-tank, which may be of any desired shape or size, this latter depending somewhat on the size of the plant and the amount of naphtha consumed. Said tank 1 is isolated from the rest of the apparatus and the building in which said apparatus is installed by being buried in the ground at a suitable depth and at a distance from the building. The tank 1 is provided with a filling-pipe 2 in its top, through which the supply of naphtha within it may be replenished, said pipe 2 being provided with a suitable cap or closure. A feed-pipe 3 leads from the bottom of said tank 1 to a stand-pipe 4, which is adapted to hold a small body of naphtha for immediate use in the carbureter. A cut-off valve 5 is provided between the main supply-tank 1 and the stand-pipe 4, by means of which the feed-pipe 3 may be closed, access to said valve being had through a valve box or casing 6. All the parts thus far described are completely isolated from the rest of the apparatus and from the building by being buried in the ground at a distance therefrom, as shown, so that all danger of explosions or fire with respect to the main supply of naphtha is eliminated. A suction-pipe 7 is provided which enters the top of said stand-pipe 4 and extends nearly to the bottom of the same, said suction-pipe 7 branching at its upper end, as shown in Fig. 3, so as to give two outlets, each of which is provided with check-valves 8 8 to prevent backflow of the naphtha. The said branches of the suction-pipe enter pipes 9 9, rising from vacuum-cylinders or suction-chambers 10 10, which suction-chambers are connected with pump-cylinders 11 11 by means of pipes 12 12. Said suction-chambers 10 10 and their connections are located outside of the building and may, if desired, be buried, as are the tank and stand-pipe described above. The pump-cylinders 11 11 are preferably placed within the building, as shown, and the connecting-pipes 12 12, preferably of small diameter, pass through the wall of the building, as shown in Fig. 1. In each of said pump-cylinders are arranged reciprocating plungers 13 13, which are operated by mechanism presently to be described, and below said plungers is placed a small body of mercury forming a liquid piston, which is forced out of the pump-cylinders and into the suction-chambers 10 10 on the descent of the plungers and flows back to the pump-cylinders as the plungers rise, the suction-chambers 10 10 being a little higher than the pump-cylinders 11 11 to effect this movement of the mercury, this action of the liquid piston creating a vacuum and suction in the chambers 10 10, thereby drawing into said suction-chambers through the branched pipe 7 a small quantity of naphtha from the stand-pipe 4, the check-valves 8 8 preventing backflow of the naphtha when the mercury rises in the suction-chambers on the descent of the plungers 13 13. The said plungers and the body of mercury controlled thereby are operated in alternation by pump-operating mechanism, to be presently described, so that the naphtha is drawn from the stand-pipe 4 in a practically continuous supply. The pipes 9 9, which rise from the suction-chambers 10 10 and into which the branches of the suction-pipe 7 enter, unite at their upper ends and form a common feed-pipe 14, which leads to the carbureter, said pipes 9 9 being provided with check-valves 15 15, opening toward the carbureter, so as to prevent any backflow of the naphtha charge therefrom when the liquid pistons are making their intake-stroke and drawing a charge from the stand-pipe 4.

The carbureter is preferably made in the form of a rectangular box or casing 16, divided by a central partition 17, and said carbureter is preferably secured to the outside of the building, as shown in Fig. 1. The space on one side of the partition 17 forms a steam-receptacle to furnish the heat for the carbureter necessary for the volatilization of the naphtha, the steam being supplied from any suitable source by means of a pipe 18, a drip-pipe being provided in the bottom of the casing 16 to carry off the water of condensation. The space on the other side of the partition 17 forms the volatilizing and mixing chamber proper, and into said mixing-chamber the naphtha-feed pipe 14 leads, as clearly shown in Figs. 1 and 3. An air-supply pipe also enters the mixing-chamber in said carbureter 16, and the air and naphtha after being commingled and converted in the usual manner pass from the carbureter to the burners through an outlet-pipe 21, connecting with the carbureter 16 at or near its bottom.

The air-supplying and air and naphtha controlling and pumping mechanism which form an important feature of the present mechanism and insure the uniform action of the plant, and the unvarying quality of the gas furnished will now be described, reference being had particularly to Figs. 1 and 4 to 7, inclusive. A blower 22 is provided, which may be of any suitable or preferred type, the one shown being an ordinary rotary blower driven by belting or gearing it to some prime motor and provided with the ordinary regulator or blow-off device 23. An air-pipe 24 leads from said blower 22 to a valve-casing 25, which latter is provided with two ports 26 27, said port 26 communicating with the air-supply pipe 20, which leads to the carbureter 16, and port 27 connecting with a pipe 20ª, leading to an air-motor 28, by which the pump-operating mechanism is actuated, as will presently be described. Within the casing 25 is a single slide-valve 29, said valve consisting of a main body portion having an offset or wing 29ª at one side, so that the valve is approximately L-shaped, as clearly shown in Figs. 5 to 7, inclusive. Normally the main portion of said valve 29 controls the port-opening 26, while the offset or wing 29ª at the side of the main portion controls the port 27, the valve occupying the position shown in Fig. 5 relative to the port-openings. The longitudinal position of the valve 29 and the opening of the ports 26 27 is automatically controlled by the following means: Leading from the air-pipe 20, which carries the air-supply to the carbureter 16, is a branch pipe 30, which enters the bottom of a reservoir 31, said reservoir being of the liquid-seal bell type, said pipe 30 entering a compartment 32 at the bottom of the reservoir, which compartment is provided with a vertical outlet-pipe which delivers into a bell 33, placed in a body of liquid in the upper part of the reservoir in a manner similar to the ordinary gasometer, so that pressure of the air within the reservoir will raise the bell 33, and when pressure falls the bell will descend. Mounted in a fixed sleeve or bearing carried by the valve-casing 25 is a rock-shaft 34, the outer end of which is provided with a crank-arm 35, which is connected by means of a link 36 with the top of the bell 33, so that the rising and falling movements of said bell will through said link and crank-arm rock the said shaft 34 in its bearing. The other end of said rock-shaft 34 enters the valve-casing 25 and carries at this inner end a second crank-arm 37, which engages lugs 38 on the valve 29, so that the rocking movements of said rock-shaft 34 are imparted to said valve 29, such rocking movements being converted into a reciprocating motion through the connections just named. The result of this construction is that the amount of air passing to the carbureter and to the motor which actuates the pumping mechanism through the respective ports 26 27 will be always automatically proportioned to the demand on the plant, for it is apparent that if the blower is supplying air in excess of what is required for the carbureter-supply and the pump-motor such excess of air will pass into the reservoir 31, and raising the bell 33 will through the rock-shaft 34 and its connections move the valve 29 so as to restrict the port-openings 26 and 27, and thereby cut down the air passing to said carbureter 16 and said pump-motor 28, so that only a sufficient amount of air and naphtha for immediate needs will be given to the carbureter. When the demand on the system increases, however, pressure within the reservoir falls, and the bell 33 descending will open the valve, so as to increase the air-supply, and consequently the output of the plant.

In order that the size of the port-opening which leads to the air-motor 28 may be varied to suit varying conditions, means for a sidewise adjustment of the valve 29 are provided, such means consisting of a cranked shaft 39, having its bearings in the side of the valve-casing 25. The cranked portion of the said shaft 39 engages lugs 40 on the said valve, so that when the shaft 39 is rotated in its bearings the valve 29 will be moved sidewise or at right angles to its other line of movement within the casing 25, and the offset or wing 29ª, which normally controls the port 27, will be so positioned relative to the said port as to diminish or increase the active area of the said port. In Fig. 5 the valve 29 is shown in its normal position, and reciprocation of the valve 29 through the automatic valve-operating means described above will open both ports 26 27 for their full width. Movement of the cranked shaft 39 will throw the valve 29 to the position shown in Fig. 6, in which position the active area of port 27 is diminished, so that reciprocation of the valve 29 will uncover only a part of the full width of port 27. A further movement of said shaft 39 will result in covering the port 27 with the main body portion of the valve 29, as shown in Fig. 7, in which position both ports 26 27 will be controlled by the body portion of the valve 29 and the function of the offset or wing 29ª will for the time being being intermitted. The cranked shaft 39 is provided with a handle 40 outside the casing 25, by means of which it may be turned and the valve 29 adjusted, and a pointer or finger 41 on the shaft serves to indicate on an index 42 on the side of the valve-casing the several adjustments and exact position of valve 29 relative to port 27. By this construction the valve 29 may be adjusted to give the exact proportions of air for the carbureter and the pump-motor which may be desired, so that by the use of this adjusting means and the automatic valve-controlling means described hereinbefore a gas of uniform and determinate quality may be produced in volumes equal to the immediate demand on the plant.

The pump-motor 28 and its operating parts and pump connections will now be described, reference being had particularly to Fig. 2, in which figure the construction is best shown. The motor 28, as shown, is of the ordinary rotary type, mounted on suitable supports and having a central driving-shaft 43, on the outer end of which is fixed a cam-wheel 53, provided with a rim that is formed, as shown, to present cam-faces 54. Engaging the inner and outer faces of said cam-ring are two antifriction-rollers 55, that are carried on the free end of an arm 57, the other end of said arm being pivoted to the base, and pivotally attached to the upper end of arm 57 is a link or bar 58, the other end of said bar 56 having a sleeve 57ª pivotally attached thereto, said sleeve being adjustably fixed by a set-screw on a segment-shaped rocker-arm 58, having its fulcrum on the shaft 43. The lower end of the rocker-arm 58 is forked, as at 59, and straddles an antifriction-roller 60, journaled on a swinging link 61, intermediate the ends of the latter. The opposite ends of the link 61 are respectively pivotally connected to one end of a bell-crank lever, being connected by pitman 63 to the pump-plungers 13. The said bell-crank levers 62 are each pivoted at 62ª to the frames or bracket 62ᵇ, as shown in Fig. 2. It will be readily understood that as the cam-wheel revolves with the motor 28 it will communicate an oscillating movement to the arms 56, 57, and 58 and through the medium of the swinging link 61 and the bell-crank levers and pitmen will reciprocate the pump-plungers alternately in opposite directions. By adjusting the link on the rocker-arm 58 toward or from the fulcrum of the latter the length of the stroke of the pump-plungers may manifestly be altered.

All of the parts above described are housed within the building, and as the naphtha does not enter such portion of the apparatus immunity from fire or explosion results. A fire-check 64 is preferably placed in the gas-supply pipe at its point of entrance into the building (see Fig. 1) to prevent firing back to the carbureter 16 and the storage-tank 1 if a fire should occur in the building in which the plant is installed.

The operation of the apparatus having been set forth in connection with the description of the various parts, it is deemed unnecessary to recite at length the action of the plant. Briefly stated, that action is as follows: Air passing from the blower 22 enters the valve-casing 25 and passing out of ports 26 27 in volumes regulated by the valve 25 enters pipes 20 20ª and passes to the carbureter 16 and the air-motor 28, respectively, excess of air passing to the reservoir 31 by means of the branch pipe 30 and through the medium of the bell 33 and its connections controlling the valve 25 and the area of ports 26 27. The air passing to the motor 28 drives the pumps 11 11 by means of the connections described at a speed proportioned to the demand on the plant, and the exact amount of naphtha is drawn from the stand-pipe 4 and injected into the carbureter 16, the air for the carbureter being likewise regulated in volume to give an accurately and properly proportioned mixture.

Having thus described my invention, what I claim as new is—

1. In a gas-generating apparatus, the combination with a carbureter, of a hydrocarbon-storage tank, a pump to deliver the hydrocarbon from said tank to said carbureter, an air-motor to operate said pump, a blower to deliver air to said motor and to said carbureter, valve-controlled ports for the air-supply for the motor and for the carbureter, and means for varying the port-openings to increase or diminish the air-supply to said motor and carbureter.

2. In a gas-generating apparatus, the combination with a carbureter, of a hydrocarbon-storage tank, a pump to deliver hydrocarbon from said tank to said carbureter, an air-motor to operate said pump, a blower to deliver air to said motor and to said curbureter, valve-controlled ports for the air-supply for the motor and for the carbureter, and automatic means for varying the port-openings to increase or diminish the air-supply to said motor and carbureter.

3. In a gas-generating apparatus, the combination with a carbureter, of a hydrocarbon-storage tank, a pump to deliver the hydrocarbon from said tank to said carbureter, an air-motor to operate said pump, a blower to deliver air to said motor and to said carbureter, a single valve controlling both the air-supply for the motor and for the carbureter, and means for varying the position of said valve to increase or diminish the air-supply to said motor and carbureter.

4. In a gas-generating apparatus, the combination with a carbureter, of a hydrocarbon-storage tank, a pump to deliver hydrocarbon from said tank to said carbureter, an air-motor to operate said pump, a blower to deliver air to said motor and to said carbureter, a single valve controlling both the air-supply for the motor and for the carbureter, and automatic means for varying the position of said valve to increase or diminish the air-supply to said motor and carbureter.

5. In a gas-generating apparatus, the combination with a carbureter, of a hydrocarbon-storage tank, a pump to deliver hydrocarbon from said tank to said carbureter, an air-motor to operate said pump, a blower to deliver air to said motor and to said carbureter, valve-controlled ports for the air-supply for the motor and for the carbureter, means for automatically varying the port-openings to increase or diminish the supply of air to said motor and carbureter, and means for adjusting the port-controlling means to limit the supply of air passing to said motor.

6. In a gas-generating apparatus, the combination with a carbureter, of a hydrocarbon-storage tank, a pump to deliver hydrocarbon from said tank to said carbureter, an air-motor to operate said pump, a blower, a valve box or casing into which said blower delivers, said valve-box being provided with two ports, a pipe connecting one of said ports with the carbureter, a second pipe connecting the other of said ports with said air-motor, means for controlling said ports, and means for varying the port-openings automatically to increase or diminish the supply of air passing through the said ports.

7. In a gas-generating apparatus, the combination with a carbureter, of a hydrocarbon-storage tank, a pump to deliver hydrocarbon from said tank to said carbureter, an air-motor to operate said pump, a blower, a valve box or casing into which the said blower delivers, said valve-box being provided with two ports, a pipe connecting one of said ports with the carbureter, a second pipe connecting the other of said ports with said air-motor, means for controlling said ports, means for varying the port-openings automatically to increase or diminish the supply of air passing through said ports, and means for adjusting said port-controlling means to vary the active area of the port leading to said air-motor.

8. In a gas-generating apparatus, the combination with a carbureter, of a hydrocarbon-storage tank, a pump to deliver hydrocarbon from said tank to said carbureter, an air-motor to operate said pump, a blower, a valve box or casing into which said blower delivers, said valve-box being provided with two ports, a pipe connecting one of said ports with the carbureter, a second pipe connecting the other of said ports with the air-motor, means for controlling said ports, and means actuated by the volume of air passing through one of said ports to automatically vary said port-openings and increase or diminish the air-supply to said motor and said carbureter.

9. In a gas-generating apparatus, the combination with a carbureter, of a hydrocarbon-storage tank, a pump to deliver hydrocarbon from said tank to said carbureter, an air-motor to operate said pump, a blower, a valve box or casing into which said blower delivers, said valve-box being provided with two ports, a pipe connecting one of said ports with the carbureter, a second pipe connecting the other of said ports with the air-motor, means for controlling said ports, means actuated by the volume of air passing through one of said ports to automatically vary said port-openings and increase or diminish the air-supply to said motor and said carbureter, and manually-operated means for adjusting said port-controlling means to vary the active area of the port leading to said air-motor.

10. In a gas-generating apparatus, the combination with a carbureter, of a hydrocarbon-storage tank, a pump to deliver hydrocarbon from said tank to said carbureter, an air-motor to operate said pump, a blower, a valve-casing into which said blower delivers, an air-supply pipe connecting said valve-box with said carbureter, a second pipe connecting said valve-box with said air-motor, means in said valve-box controlling the port-openings to said air-supply pipes, an air-reservoir connected with one of said air-supply pipes, a rising-and-falling liquid-seal bell in said reservoir, and connections between said rising-and-falling bell and said port-controlling means, whereby the position of the latter is varied and the port-openings increased or diminished by the air-pressure within the bell.

11. In a gas-generating apparatus, the combination with a carbureter, of a hydrocarbon-storage tank, a pump to deliver hydrocarbon from said tank to said carbureter, an air-motor to operate said pump, a blower, a valve-casing into which said blower delivers, an air-supply pipe connecting said valve-box with said carbureter, a second pipe connecting said valve-box with said air-motor, means in said valve-box controlling the port-openings to said air-supply pipes, an air-reservoir connected with the carbureter air-supply pipe, a rising-and-falling liquid-seal bell in said reservoir, and connections between said rising-and-falling bell and said port-controlling means, whereby the position of the latter is varied and the port-openings increased or diminished by the air-pressure within the bell, and means for manually adjusting said port-controlling means to vary the active area of the port leading to said air-motor.

12. In a gas-generating apparatus, the combination with a carbureter, of a hydrocarbon-storage tank, a liquid piston-pump to deliver hydrocarbon from said tank to said carbureter, an air-motor to operate said liquid piston-pump, a blower, a valve-box into which said blower delivers, an air-supply pipe leading from said valve-box to said carbureter, a second pipe connecting said valve-box and said air-motor, means controlling the port-openings to said supply-pipes, an air-reservoir connected with said carbureter air-supply pipe, a rising-and-falling liquid-seal bell in said reservoir, a rock-shaft operatively connected with said rising-and-falling bell, and connections between said rock-shaft and said port-controlling means, whereby the position of the latter is varied and the port-openings increased or diminished by the air-pressure within said bell.

13. In a gas-generating apparatus, the combination with a carbureter, of a hydrocarbon-storage tank, a liquid piston-pump to deliver hydrocarbon from said tank to said carbureter, a blower, a valve-box into which said blower delivers, an air-supply pipe leading from said valve-box to said carbureter, a second pipe connecting said valve-box and said air-motor, means controlling the port-openings to said supply-pipes, an air-reservoir connected with said carbureter air-supply pipe, a rising-and-falling liquid-seal bell in said reservoir, a rock-shaft mounted in said valve-box and operatively connected with said rising-and-falling bell, connections between said rock-shaft and said port-controlling means, whereby the position of the latter is varied and the port-openings increased or diminished by the air-pressure within said bell, means for manually adjusting said port-controlling means to vary the active area of the port-opening leading to the air-motor, and an indicating device to show the adjustment of the port-controlling means relative to the said motor supply-port.

14. In a gas-generating apparatus, the combination with a carbureter, of a hydrocarbon-storage tank, a liquid piston-pump to deliver the hydrocarbon from said tank to said carbureter, an air-motor to operate said pump, an air-supply, pipes connecting said carbureter and said air-motor with said air-supply, an L-shaped valve controlling the port-openings of both supply-pipes, and means actuated by the air-pressure in the said carbureter supply-pipe to vary the position of said L-shaped valve and increase or diminish the port-openings.

15. In a gas-generating apparatus, the combination with a carbureter, of a hydrocarbon-storage tank, a liquid piston-pump to deliver the hydrocarbon from said tank to said carbureter, an air-motor for operating said pump, an air-supply, pipes connecting said motor and said carbureter with said air-supply, a valve controlling the port-opening to said carbureter supply-pipe, an offset or wing on said valve controlling the port-opening to said motor supply-pipe, means for automatically varying the position of said valve to increase or diminish the port-openings, and means for adjusting said valve to vary the active area of said motor supply-port.

16. In a gas-generating apparatus, the combination with a carbureter and a hydrocarbon-storage tank, of a blower to supply air to said carbureter, an air-motor connected with and driven by said blower, a liquid piston-pump having two pumping-cylinders to deliver hydrocarbon from said tank to said carbureter, plungers in said pumping-cylinders, a cam on said air-motor shaft, and connections between said cam and said pump-plungers to reciprocate the latter alternately.

17. In a gas-generating apparatus, the combination with a carbureter and a hydrocarbon-storage tank, of a blower to supply air to said carbureter, an air-motor connected with and driven by said blower, a liquid piston-pump having two pumping-cylinders to deliver hydrocarbon from said tank to said carbureter, reciprocating plungers in said cylinders, a cam on the air-motor shaft, an oscillating bar pivotally mounted on suitable supports and oscillated by said cam, and connections between said bar and said reciprocating plungers, whereby said plungers are reciprocated alternately.

18. In a gas-generating apparatus, the combination with a carbureter and a hydrocarbon-storage tank, of a liquid piston-pump having two pumping-cylinders to deliver hydrocarbon from said tank to said carbureter, reciprocating plungers in said pumping-cylinders, a blower to supply air to said carbureter, an air-motor connected with and driven by said blower, a cam on said air-motor shaft, a lever pivoted at one end and engaging said cam at its other end, a rocker-arm operatively connected with said lever, an oscillating bar connected with and reciprocated by said rocker-arm, and connections between said oscillating bar and said reciprocating plungers, whereby said plungers are reciprocated alternately.

19. In a gas-generating apparatus, the combination with a carbureter and a hydrocarbon-storage tank, of a liquid piston-pump having two pumping-cylinders to deliver hydrocarbon from said tank to said carbureter, a blower to supply air to said carbureter, an air-motor connected with and driven by said blower, a cam on said air-motor shaft, a lever pivoted at one end and engaging said cam at its other end, a rocker-arm operatively and adjustably connected with said lever, an oscillating bar connected with and reciprocated by said rocker-arm, and connections between said oscillating bar and said reciprocating plungers, whereby said plungers are reciprocated alternately.

20. In a gas-generating apparatus, the combination with a carbureter and a hydrocarbon-storage tank, of a liquid piston-pump having two pumping-cylinders to deliver hydrocarbon from said tank to said carbureter, reciprocating plungers in said pumping-cylinders, a blower to supply air to said carbureter, a cam on the air-motor shaft, a lever pivoted to a suitable support and engaging said cam, a rocker-arm, adjustable connections between said cam-operated lever and said rocker-arm, an oscillating bar connected with and reciprocated by said rocker-arm, and bell-crank levers connecting said bar with said pump-plungers, whereby reciprocation of said bar will move said plungers alternately.

In testimony whereof I have hereunto set my hand in presence of two subscribing witnesses.

CLARENCE M. KEMP.

Witnesses:
JOHN S. COLE,
CHARLES I. PUMELL.